Dec. 17, 1929.   H. E. BRICE   1,740,328
COUPLING
Filed May 7, 1928   4 Sheets-Sheet 1
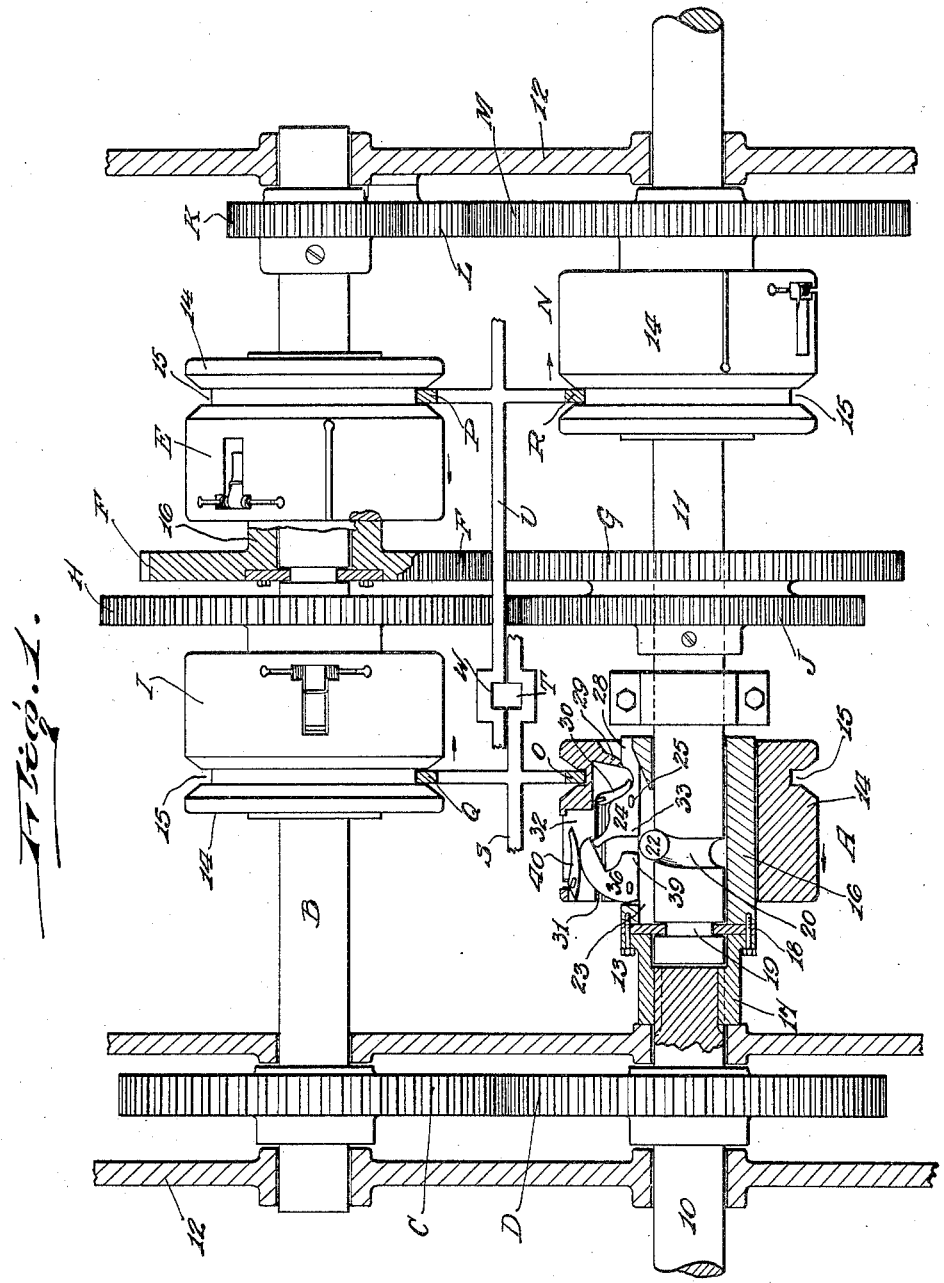

Dec. 17, 1929.  H. E. BRICE  1,740,328
COUPLING
Filed May 7, 1928   4 Sheets-Sheet 2
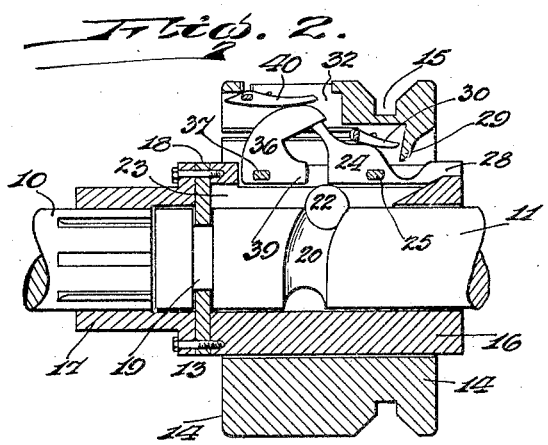
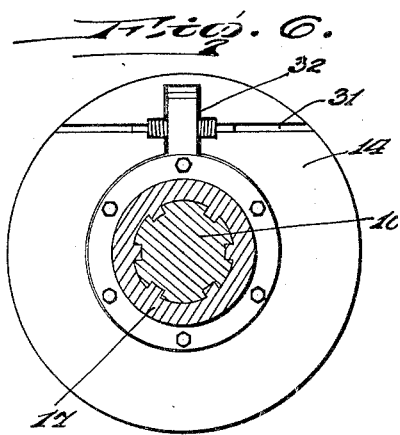
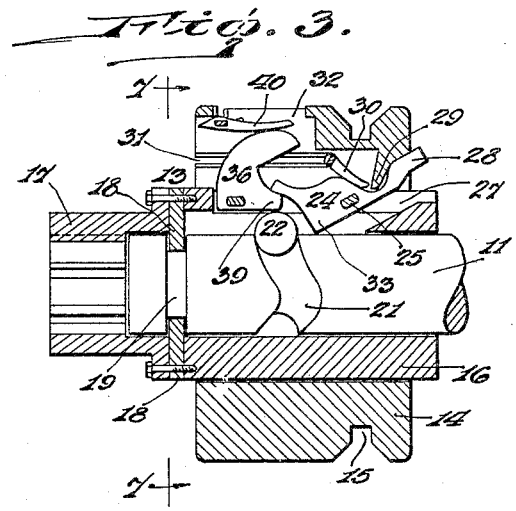
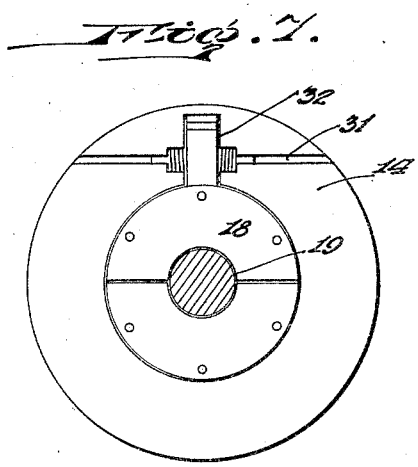
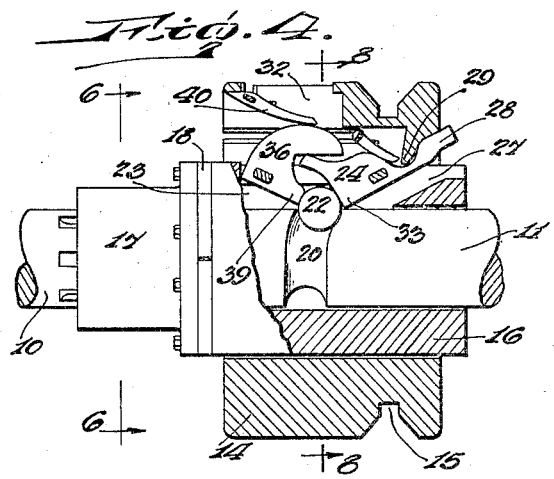
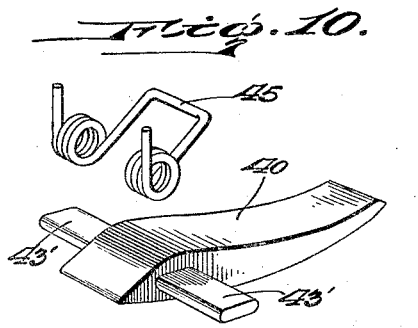
HENRY E. BRICE
INVENTOR
BY Victor J. Evans
ATTORNEY Dec. 17, 1929.   H. E. BRICE   1,740,328
COUPLING
Filed May 7, 1928   4 Sheets-Sheet 3
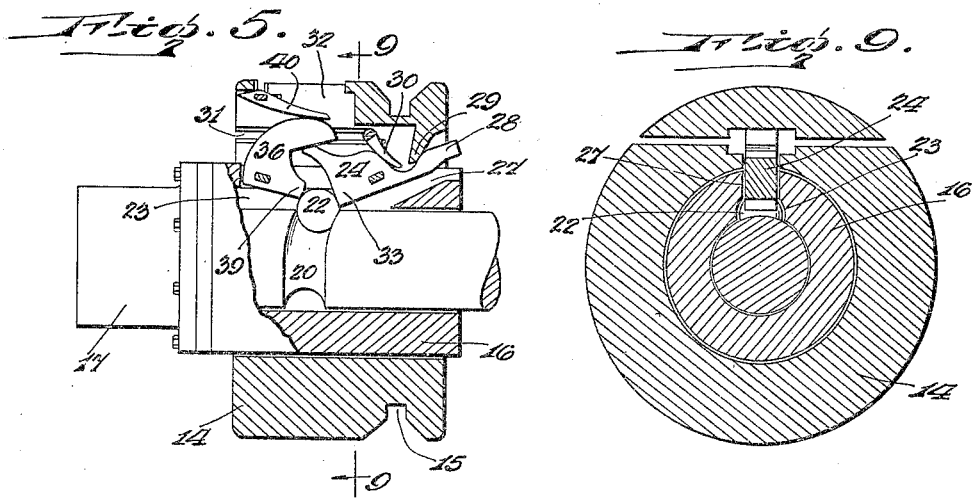
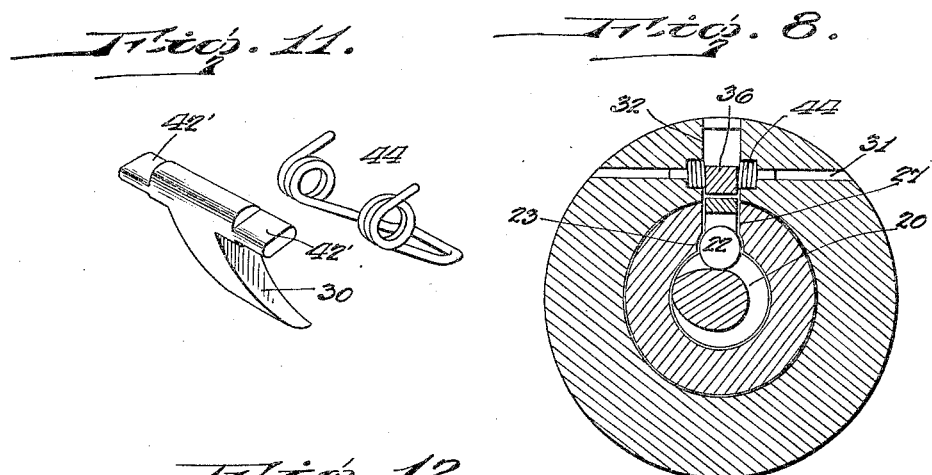
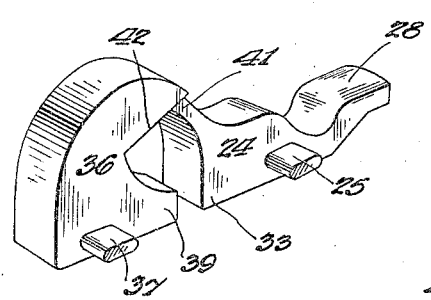
HENRY E. BRICE
INVENTOR
BY Victor J. Evans
ATTORNEY

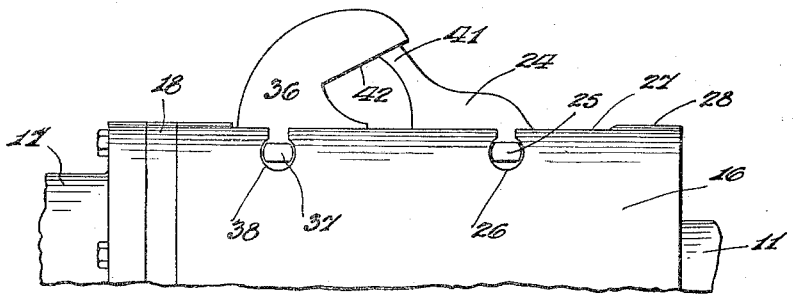
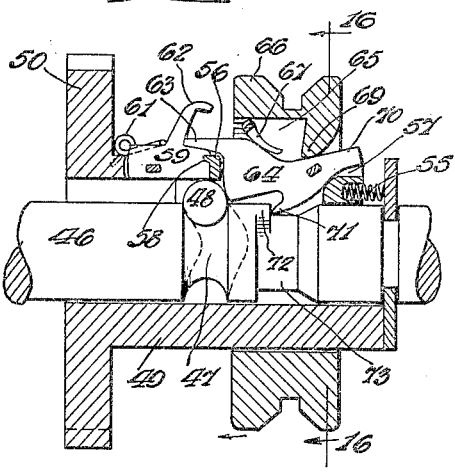
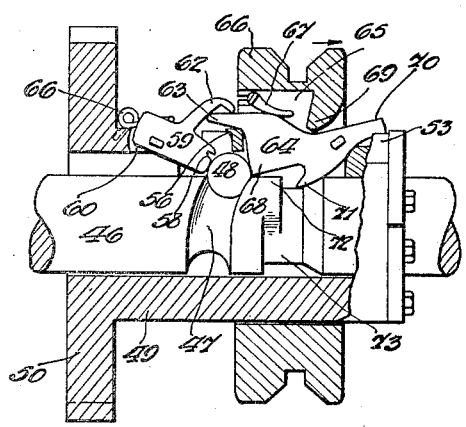
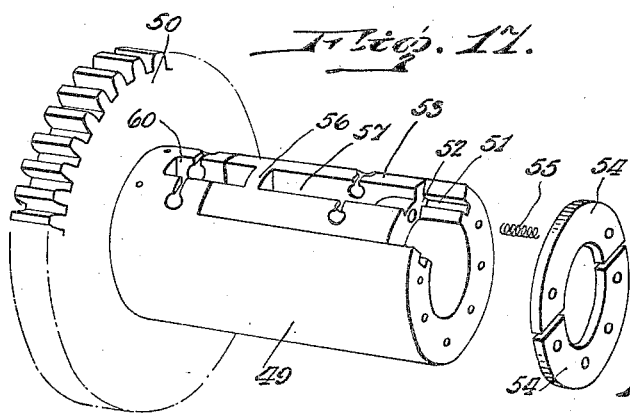
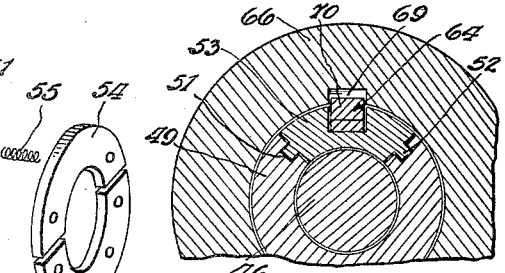

Patented Dec. 17, 1929

1,740,328

UNITED STATES PATENT OFFICE

HENRY E. BRICE, OF NEW YORK, N. Y.

COUPLING

Application filed May 7, 1928. Serial No. 275,898.

This invention relates to couplings and constitutes an improvement over my U. S. Letters-Patent No. 1,629,375, dated May 17th, 1927.

The primary object of this invention is similar to that of my prior patent above mentioned, in that it aims to provide a means for locking two rotative bodies, such as two shafts, a shaft or sleeve, or a gear and shaft, so that they rotate as a single unit and which lock as thorough and positive as if they were provided with interlocking teeth, but having no clashing parts during the locking operation. However, in my former patent, the reciprocating member present in this invention, had its path of movement blocked in one direction during locking of the parts by means of an obstructing member moved into its path, which in theory might seem to make a tight coupling, but in practice there is a small amount of free play due to the shaft being able to turn loosely for a fraction of a revolution in either direction before causing the part to turn therewith. It is therefore, one of the main objects of this invention to eliminate this free play or backlash.

Another object of the invention resides in a coupling for variable speed transmissions by the use of which the variable gears may be mounted so as to always mesh to prevent the clashing of gears during the shifting from one speed to another, as it only becomes necessary to selectively actuate the respective couplings to obtain the desired speed, and which actuation of the couplings is quiet and easy.

Another object of the invention is to provide a transmission coupling which embodies a reciprocable member carried by a constantly rotatable part, and obstructing members movable into the path of movement of the reciprocable member in opposite directions to firmly lock the reciprocating member against free play.

A further object is the provision of a coupling including a reciprocating member in the form of a ball adapted to be locked by a pair of obstructing members, the movement of the obstructing members being so timed when being moved to obstructing position, that they reach their proper obstructing position before being engaged by the ball, to prevent undue wear and friction between the parts.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a sectional elevational view of my improved transmission.

Figure 2 is an enlarged vertical sectional view through the transmission coupling showing the shifting collar moved to a released position and the position of the obstructing members prior to their movement to obstructing positions.

Figure 3 is a similar view but showing the position of the parts with the primary obstructing member in obstructing position.

Figure 4 is a similar view but showing the position of the parts with both obstructing members in obstructing position.

Figure 5 is a similar view showing the position of the parts as the shifting collar starts its return movement.

Figure 6 is a vertical transverse sectional view on the line 6—6 of Figure 4.

Figure 7 is a similar view on the line 7—7 of Figure 3.

Figure 8 is a similar view on the line 8—8 of Figure 4.

Figure 9 is a similar view on the line 9—9 of Figure 5.

Figure 10 is a detail perspective view of the spring actuated dog for the secondary obstructing member.

Figure 11 is a detail perspective view of the spring actuated dog for the primary obstructing member.

Figure 12 is a detail perspective view of the co-acting obstructing members.

Figure 13 is a detail side elevation of the coupling with the sliding collar removed.

Figure 14 is a detail vertical longitudinal sectional view through a modified form of coupling with the parts in partially locked position.

Figure 15 is a similar view but showing the parts in an operative position.

Figure 16 is a vertical transverse sectional view on the line 16—16 of Figure 14.

Figure 17 is a detail perspective view of the rotating body with the actuating pawls removed.

Referring to the drawings by reference characters, the numeral 10 designates a clutch shaft or crank shaft of an engine, and 11 a driven or propeller shaft journalled in bearings provided in the transmission housing 12 in axial alignment with the drive shaft 10 and swivelly connected therewith by a swivel joint 13.

Mounted on the shaft 11 for operatively connecting the shafts 10 and 11 is a coupling device A, which when actuated to operatively connect the shafts effects a direct drive between the shafts 10 and 11, at which time the transmission may be said to be in high gear.

Journalled in the transmission housing is a counter-shaft B having a gear C fixed thereon which constantly meshes with a gear D fixed to the drive shaft 10, and through which power is transmitted to the counter shaft which always rotates with the clutch shaft.

Mounted on the counter shaft is a coupling device E which operates to operatively connect the counter-shaft with a gear F which constantly meshes with a gear G fixed to the driven shaft 11. The gears F and G constitute low gear or first speed when the coupling device is in operative position.

Second speed or intermediate is obtained by providing a gear H loosely mounted on the counter shaft and which may be operatively connected thereto by a coupling device I carried by the counter-shaft. The gear H constantly meshes with a gear J fixed to the driven shaft 11 and which is integral with the gear G. By connecting the gear H with the counter-shaft by the actuation of the coupling device I, intermediate speed will be transmitted from the drive shaft to the driven shaft.

Having described the method of obtaining the three forward speeds, I shall now explain the means by which reverse speed of the driven shaft may be obtained. For this purpose, I provide a relatively small gear or pinion K on the counter-shaft which constantly meshes with an idler gear L, which in turn meshes with a relatively large gear M loosely mounted on the driven shaft 11. The gear M may be operatively connected with the driven shaft by actuating a coupling device N carried thereby.

All of the coupling devices A, E, I and N are of identical construction and will be hereinafter described but it might be well to mention at this time that each of them includes a sliding collar 14 movable to an operative position in the direction shown by the arrows in Figure 1 of the drawings. Each collar has an annular groove 15 in the exterior thereof for receiving the shifting yokes O, P, Q and R which engage the respective coupling devices A, E, I and N. The yokes O and Q are carried by a shifting bar S having a gear shift lever notch T therein, while the yokes P and R are mounted on a gear shifting rod U having a gear shifting lever notch W therein. When the notches are in alignment as shown in Figure 1 of the drawing, the transmission is in neutral but by shifting the conventional gear shift lever, the bars S and U may be selectively moved in opposite directions to actuate the several coupling devices in order to obtain the variable speeds. This arrangement has been shown to illustrate the uses of the coupling device wherein it is capable of operatively connecting two axially aligned shafts, a shaft and gear, or in fact any two bodies, one of which is rotatably driven and wherein it is desired to operatively connect the other body thereto.

As hereinbefore mentioned, all of the coupling devices are identical in construction and operation, and for illustrative purposes, I have shown the coupling device A in detail in the drawings, which operatively connects two axially aligned shafts 10 and 11.

The sliding collar 14 is mounted on a fixed stationary collar or body 16 which surrounds the shaft 11 and which body is turnable with the drive shaft 10 by bolting the same to a collar 17 keyed to the end of the shaft 10. Bolted between the body 16 and collar 17 is a plate or washer 18 which surrounds the reduced portion 19 on the shaft 11 and which construction constitutes the swivel joint 13 hereinbefore mentioned.

The coupling end of the driven shaft 11 is provided with a continuous cam shaped groove 20 which extends about the periphery of the shaft and which is offset as at 21 in a manner so that the cam portion of the groove is out of a perpendicular plane with the major portion of the same. The offset is to the right of the vertical plane for a purpose to be more fully explained. Seated in the groove is a reciprocating member in the form of a steel ball 22 movable longitudinally in a slot 23 provided in the body 16. It will be evident that the ball may travel lengthwise in the slot 23 and reciprocates as the shaft 10 rotates.

From the description thus far, it will be seen that if the shaft 10 is rotated, the ball 22 is forced to slide to the right and left by reason of the same travelling in the cam shaped groove 20 but it is my intention to provide means for locking and unlocking this ball by permitting or impeding this right and left movement. If when the ball is at the limit of its right movement in the offset 21 of the cam groove, something is placed in its path to prevent its returning to the left again, both shafts will be locked together for simultaneous rotation. For controlling the operation of the ball 22, I provide primary and second obstructing members, the former being in the form a pawl 24 having flattened trunnions 25 extending from opposite sides thereof for removable seating engagement in key hole shaped slots 26 provided in the walls of the slot 27 in the body 16. The pawl includes a tail 28 adapted to be held down when in operative position by a finger 29 on the sliding collar 14, against the action of spring actuated pivoted dog 30 mounted within slots 31 provided in the walls of a recess 32 in the collar 14. When the collar 14 has been shifted to release the pawl, the same will drop to an obstructing position but in order to lock the ball against movement toward the left, I provide a secondary obstructing member in the nature of a pawl 36, also having flattened trunnions 37 for removable seating in keyhole shape slots 38 in the side walls of the recess 27. This pawl has an obstructing nose or shoulder 39 which tends to move into the slot 23 into the path of movement of the ball toward the left, by a spring actuated dog 40 pivoted in the walls of the recess 32. However, the pawl 36 is held in a raised inoperative position by a finger 42 on the pawl 24 which engages the inclined flat face 42 of the pawl 36.

In operation, assume that the parts of the coupling device are in inoperative position as shown in Figure 1 of the drawings, and it is desired to effect a direct driving connection between the shaft 10 and the shaft 11. The collar 14 is shifted toward the left as shown in Figure 2, whereupon the auxiliary pawl or obstructing member 24 is released by the finger 29. As the body 16 rotates, the pawl 24 will drop to obstructing position at which time the ball is at the limit of its movement toward the left as shown in Figure 3 of the drawings. The pawl 24 having been released by the collar is now free of the pawl or obstructing member 36 which is being acted upon by the spring pressed dog 40 but the ball being in the path of movement of the pawl 36 prevents it from falling in the path of sliding movement thereof. However, as the ball gradually moves toward the right and as it reaches the offset portion 21 of the cam groove, the same clears the nose 39 of the pawl 36 whereupon this pawl instantly drops into obstructing position, and co-acts with the pawl 24 to firmly engage the ball and prevent any free movement thereof. The ball is now locked in the offset portion of the groove which locks the shaft 11 to the rotating body 16 driven by the drive shaft 10, whereupon the two shafts turn as one. The positions are such that the ball is not caught at the extreme point of the offset 21, but on one of the two slanting sides of the groove which lead to it.

To release the pawl 24 to return the parts to normal or inoperative position, the collar 14 is slid in a reverse direction, so that the finger 29 engages the tail 28 of the pawl to depress the same which lifts the nose 33 upwardly. The nose moves out of engagement with the ball and as it moves upward, the finger 41 rides over the flat race 42 of the pawl 36 and lifts the pawl 36 out of obstructing position against the action of the spring pressed dog 40. The pawls are now free of the ball and it is also free to move in the groove 20, at which time the shaft 10 rotates freely with respect to the shaft 11.

Hereinbefore, I have described the dogs 30 and 40 as being spring pressed, and like the pawls, they are provided with outwardly extending flattened trunnions 42' and 43' respectively, journalled in slots provided in the walls of the recess 32. Springs 44 and 45 respectively actuate the dogs 30 and 40, both of which are identical in construction, as each includes a single length of resilient wire bent into axially aligned coils for fitting over the respective trunnions, while the general shape of the spring is U-shape with its bight portion bearing against the body of the dogs. The pawls and dogs are all removably mounted without the use of separate fastening elements to enable the quick assembly and disassembly of the parts as they are provided with trunnions which seat in the ends of the slots respectively provided therefor.

In Figures 14 to 17 inclusive, I have shown a slightly modified form of coupling device wherein a different ball locking means is provided. In this form 46 represents a drive shaft having a cam groove 47 therein in which a steel ball 48 is movable, while a sleeve or body 49 surrounds the shaft and has a gear 50 integral therewith. The body is provided with longitudinal grooves 51 for receiving ribs 52 provided on the longitudinal sides of a sliding carriage 53. Split plates 54 surround the shaft 46 and act as an abutment for springs 55 which act upon the carriage to force the same to an inward position, whereby a tooth 56 formed in a transverse partition in a recess 57 in the carriage, engages a notch 58 provided in a pivoted pawl 59 mounted in the side walls of a recess 60 in the body which is in alignment with the recess 57 in the carriage. A spring 61 acts upon the pawl 59 to force the same downward into the path of reciprocating movement of the ball but which is held by the co-acting tooth and notch. The pawl is formed with a finger 62 which is engaged by a finger 63 provided on a pawl 64 pivoted in a recess 57 provided in the sliding carriage 53. A spring pressed dog 67 pivoted in the recess 65 of the collar 66 acts upon the pawl 64 to force its obstructing nose 68 into the path of the ball 48 but which pawl is normally held in a raised position by the finger 69 of the collar riding on the tail 70 of the pawl. The pawl 64 also has a finger 71 adapted to seat on a ledge 72 on the shaft 46 when released by the finger 69 and prior to the extreme movement of the ball to the limit of its movement toward the left. After the left movement of the ball, the turning shaft causes the finger 71 to clear the ledge 72 by dropping into the widened groove 73 in the shaft.

The operation of the modified form is somewhat similar to the operation of the preferred form and is as follows:—Sliding movement is imparted to the collar 66 in the direction of the arrow in Figure 14 which releases the tail 70 of the pawl 64, whereupon the spring actuated dog 67 forces the same into an obstructing position as the finger 71 clears the ledge 72 on the shaft and rides into the widened groove 73 at which time the ball 48 is at the limit of its movement toward the left. As the ball moves into the offset portion of the cam groove 47, it moves toward the right and pushes against the pawl 64 causing the carriage 53 to slide in the same direction against the action of the springs 55. This movement of the carriage releases the tooth 56 from the notch 58 in the pawl 59, whereupon the spring 61 moves the nose of the pawl into obstructing position as shown in Figure 15 of the drawings.

To release the ball, the collar 66 is shifted toward the right in the direction of the arrow in Figure 15 which causes the finger 69 to depress the tail of the pawl 64 which lifts the pawl, and in its outward movement, the finger 63 of the pawl 64 engages the pawl 59 thus simultaneously lifting the pawl 59 out of the path of the ball, which permits the springs 55 to return the carriage to its former position wherein the tooth 56 engages the notch 58 of the pawl 59.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a coupling, the combination of a driving rotatable part, a driven rotatable part, a reciprocable member movable in a path parallel to the axis of said parts, means on one of said parts for imparting reciprocation to said member upon rotation of the said part in either direction, co-acting obstructing members movable into the path of movement of said member in respectively opposite directions, and means for controlling the actuation of said co-acting obstructing members to and from obstructing positions.

2. In a coupling, the combination of a driving rotatable part, a driven rotatable part, a reciprocable member movable in a path parallel to the axis of said parts, means on one of said parts for imparting reciprocation to said member upon rotation of said part, a pair of co-acting locking members, means for holding said locking members out of the path of movement of said reciprocable member in opposite directions to allow said parts to rotate independently of each other, and control means for actuating said last means for moving the respective locking members into the path of movement of said reciprocable member in opposite directions to cause the same to engage opposite sides of the reciprocable member whereby to operatively connect the driven part with the driving part.

3. In a coupling, the combination of a driving rotatable part, a driven rotatable part, a reciprocable member rotatable with one of said parts, a pair of obstructing members normally disposed out of the path of said reciprocable member in opposite directions and capable of movement into the path of the same in opposite directions for causing said rotatable parts to revolve together.

4. In a coupling, the combination of a driving rotatable part, a driven rotatable part, a reciprocable member rotatable with one of said parts, a pair of obstructing members normally disposed out of the path of said reciprocable member in opposite directions and capable of movement into the path of the same for causing said rotatable parts to revolve together, means tending to move said obstructing members into obstructing positions, one of said obstructing members engaging the other obstructing member to hold the same out of obstructing position by the action of said means, and means for releasing the first mentioned obstructing member which in turn releases the other obstructing member to allow the same to successively move into the path of movement of said reciprocating member in opposite directions.

5. In a coupling, a driving rotatable part, a driven rotatable part, a cam shaped groove provided in said driven rotatable part, a body slidably and non-rotatably connected to said driving part and seated in said groove, and a pair of obstructing members carried by said driving rotatable part and movable into engagement with opposite sides of said body upon the limit of its sliding movement in one direction to cause simultaneous rotation of said parts.

6. In a coupling, a driving rotatable part, a driven rotatable part, a cam shaped groove provided in said driven rotatable part, a body slidably and non-rotatably connected to said driving part and seated in said groove, and a pair of obstructing members carried by said driving rotatable part and movable into engagement with opposite sides of said body upon the limit of its sliding movement in one direction to cause simultaneous rotation of said parts, and manually actuated means for effecting the actuation of said obstructing members to obstructing and non-obstructing positions.

In testimony whereof I have affixed my signature.

HENRY E. BRICE.